US012325087B2

(12) United States Patent
Huang

(10) Patent No.: US 12,325,087 B2
(45) Date of Patent: Jun. 10, 2025

(54) PORTABLE SPOT WELDER

(71) Applicant: Shenzhen Jueqi Technology Co., Ltd., Guangdong (CN)

(72) Inventor: Xiaowei Huang, Hunan (CN)

(73) Assignee: Shenzhen Jueqi Technology Co., Ltd., Shenzhen (CN)

( * ) Notice: Subject to any disclaimer, the term of this patent is extended or adjusted under 35 U.S.C. 154(b) by 658 days.

(21) Appl. No.: 17/748,202

(22) Filed: May 19, 2022

(65) Prior Publication Data

US 2023/0055533 A1 Feb. 23, 2023

(30) Foreign Application Priority Data

Aug. 19, 2021 (CN) .......................... 202121960561.8

(51) Int. Cl.
*B23K 3/03* (2006.01)
*B23K 37/02* (2006.01)
(52) U.S. Cl.
CPC .......... *B23K 3/0323* (2013.01); *B23K 3/0338* (2013.01); *B23K 37/0205* (2013.01)

(58) Field of Classification Search
CPC .... A61N 7/00; A61N 2007/0026; A61B 8/54; A61B 8/0808; A61B 8/085; A61B 8/5207; A61B 5/00; A61B 8/08; A61M 21/00
See application file for complete search history.

(56) References Cited

U.S. PATENT DOCUMENTS

2023/0293914 A1* 9/2023 Zheng ...................... A61B 8/54
600/439

* cited by examiner

*Primary Examiner* — Robert G Bachner
(74) *Attorney, Agent, or Firm* — Birchwood IP

(57) ABSTRACT

Disclosed is a portable spot welder. The spot welder includes a control board; a battery connected to the control board; an analog-to-digital converter (ADC) detection module connected to the control board; a power metal oxide semiconductor (MOS) module connected to the battery; an optical-coupler isolation driving module connected to the power MOS module and the control board; a battery protection module connected to the battery and the control board; a power supply module connected to the battery protection module and the control board; and a soldering iron module connected to the battery protection module and provided with spot welding pen interfaces. The spot welder can be connected to an external spot welding pen for use or used as an emergency power bank. A safety coefficient is improved, risks of overheating, overcurrent and a short circuit of a portable spot welder body are reduced, and a size is reduced.

7 Claims, 1 Drawing Sheet

PORTABLE SPOT WELDER

CROSS REFERENCE TO RELATED APPLICATIONS

The present application claims the benefit of Chinese Patent Application No. 202121960561.8 filed on Aug. 19, 2021, the contents of which are incorporated herein by reference in their entirety.

TECHNICAL FIELD

The present disclosure relates to the field of spot welder technical apparatuses, and in particular to a portable spot welder.

BACKGROUND ART

The existing spot welder is generally connected to a mains supply by means of an adapter for use or powered by an external lithium battery, the applicable voltage range of battery power supply is narrow, and the spot welder needs to be externally provided with a battery, resulting in relatively large use size.

The power manager needs to be additionally arranged for part of spot welding powered by the mains supply, and meanwhile, existing batteries have different specifications and technologies, such that it is easy to make the batteries overdischarge in the use process, resulting in battery damage. The user needs to voluntarily determine whether a short circuit occurs in the welding process, so as to avoid damage to a battery/power supply and a control board, such that the use is extremely inconvenient; and the user use interface of the small spot welder is not visual enough.

Therefore, there is an urgent need for a portable spot welder that can solve one or more problems above.

SUMMARY

In order to solve one or more problems in the prior art, the present disclosure provides a portable spot welder. the technical solution used by the present disclosure in order to solve the problems above is as follows: a portable spot welder includes: a control board, a logic chip being arranged on the control board; a battery, the battery being electrically connected to the control board; an analog-to-digital converter (ADC) detection module, the ADC detection module being electrically connected to the control board; a light emitting diode (LED) module, the LED module being electrically connected to the control board; a key module, the key module being electrically connected to the control board; a power metal oxide semiconductor (MOS) module, the power MOS module being electrically connected to the battery, and being used for adjusting output power; an optical-coupler isolation driving module, the optical-coupler isolation driving module being electrically connected to the power MOS module and the control board; a battery protection module, the battery protection module being electrically connected to the battery and the control board, and being used for performing overcharge, overdischarge, overcurrent and short-circuit protection on the battery; a power supply module, the power supply module being electrically connected to the battery protection module and the control board, and being provided with a charging interface and a discharging interface; and a soldering iron module, the soldering iron module being electrically connected to the battery protection module, and being provided with spot welding pen interfaces, where the ADC detection module is used for detecting the battery, the power supply module and the soldering iron module and feeding data back to the control board, which are a basis.

Further, the portable spot welder further includes: a buzzer module, where the buzzer module is electrically connected to the control board.

Further, the key module includes a switch key and a gear switch key, where the switch key is used for startup and shutdown and mode switch.

Further, the key module further includes: a manual spot welding key; the LED module includes: gear indicator lamps, electric quantity indicator lamps and switch indicator lamps; and the at least two gear indicator lamps and the at least two electric quantity indicator lamps are arranged.

The present disclosure achieves the beneficial values: the present disclosure electrically connects the control board, the battery, the ADC detection module, the power MOS module, the optical-coupler isolation module, the soldering iron module and other circuits and components together by means of ingenious layout, thereby monitoring a state of the battery in real time, reducing risks of overcharge, overdischarge, overcurrent and a short circuit, and prolonging service life of the battery; isolates input and output by means of the optical-coupler isolation module, and moreover, detects whether an output end is short-circuited, so as to protect the portable spot welder and the battery; detects voltage of the circuits and temperatures of the components by means of the ADC detection module, thereby improving a safety coefficient during use; integrates functions of a power bank pipeline, thereby achieving bidirectional charge and discharge to serve as an emergency power bank; may use spot welding pens commonly used in a market by means of the spot welding pen interfaces, and adds a temperature control function to automatically adjust a temperature of a current gear, thereby achieving optimal gear welding power, and simultaneously saving electric energy; and monitors a temperature, voltage, current, etc. of the portable spot welder, gives an alarm prompt when the portable spot welder is abnormal, and moreover, has a small overall size and is convenient to carry. What is described above greatly improves practical values of the present disclosure.

REFERENCE NUMERALS

Figure 1:
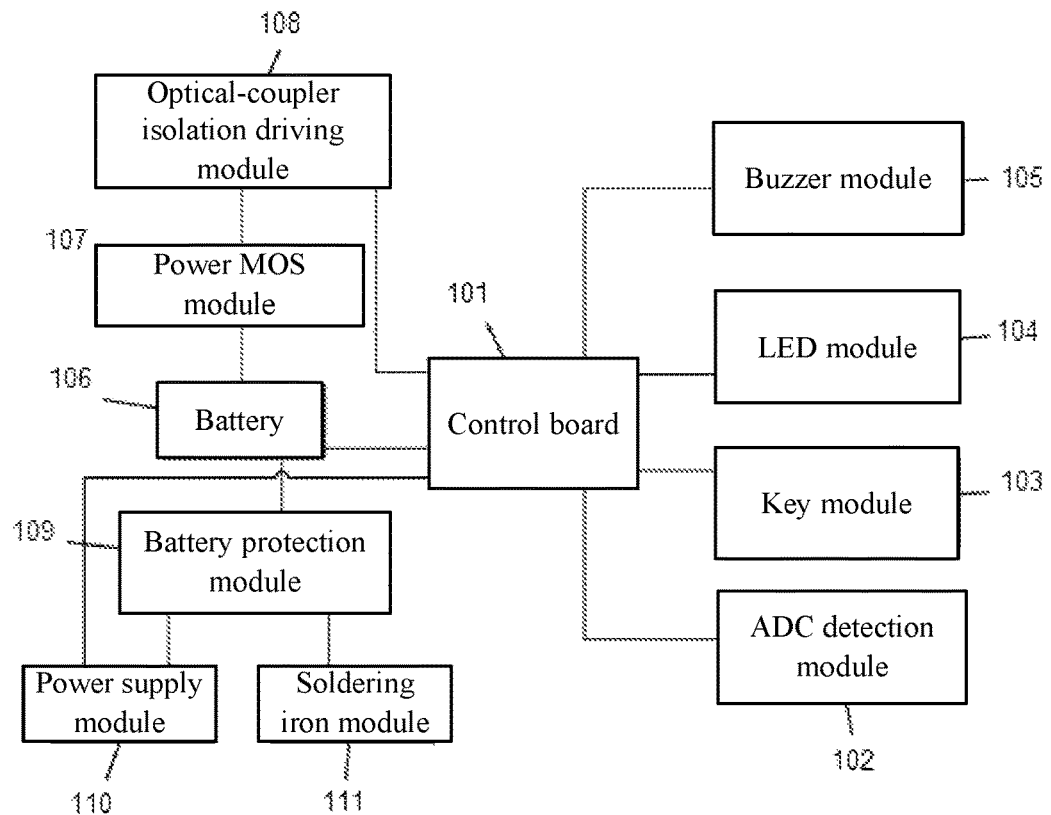
FIG. 1 is a schematic block diagram of a circuit of a portable spot welder of the present disclosure.

101 . . . control board
102 . . . analog-to-digital converter (ADC) detection module
103 . . . key module
104 . . . light emitting diode (LED) module
105 . . . buzzer module
106 . . . battery
107 . . . power metal oxide semiconductor (MOS) module
108 . . . optical-coupler isolation driving module
109 . . . battery protection module
110 . . . power supply module
111 . . . soldering iron module
201 . . . spot welder
202 . . . switch key
203 . . . gear switch key 204 . . . manual spot welding key
205 . . . manual switch indicator lamp
206 . . . automatic switch indicator lamp
207 . . . electric quantity indicator lamp
208 . . . gear indicator lamp
209 . . . spot welding pen interface
210 . . . universal serial bus (USB) interface
211 . . . Type-c interface.

DETAILED DESCRIPTION OF THE EMBODIMENTS

In order to enable the objectives, features, and advantages mentioned above of the present disclosure to be more apparent and easily understood, specific implementations of the present disclosure will be described in detail below with reference to the drawings. Many specific details are set forth in the following description to facilitate full understanding of the present disclosure. However, the present disclosure may be implemented in many other ways different from those described herein, similar improvements may be made by those skilled in the art without departing from the connotation of the present disclosure, and therefore the present disclosure is not limited by specific embodiments disclosed below.

Figure 2:
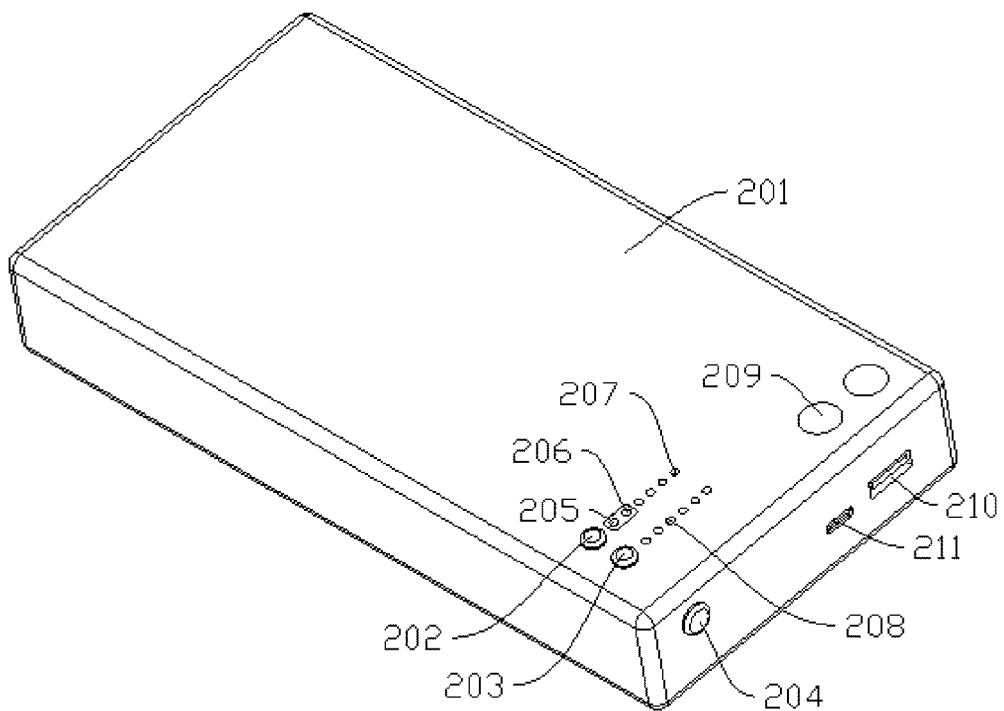
FIG. 2 is a stereogram of the portable spot welder of the present disclosure.

As shown in FIGS. 1 and 2, the present disclosure discloses a portable spot welder. The portable spot welder includes: a control board 101, a logic chip being arranged on the control board 101; a battery 106, the battery 106 being electrically connected to the control board 101; an analog-to-digital converter (ADC) detection module 102, the ADC detection module 102 being electrically connected to the control board 101; a light emitting diode (LED) module 104, the LED module 104 being electrically connected to the control board 101; a key module 103, the key module 103 being electrically connected to the control board 101; a power metal oxide semiconductor (MOS) module 107, the power MOS module 107 being electrically connected to the battery 106, and the power MOS module 107 being used for adjusting output power; an optical-coupler isolation driving module 108, the optical-coupler isolation driving module 108 being electrically connected to the power MOS module 107 and the control board 101; a battery protection module 109, the battery protection module 109 being electrically connected to the battery 106 and the control board 101, and the battery protection module 109 being used for performing overcharge, overdischarge, overcurrent and short-circuit protection on the battery; a power supply module 110, the power supply module 110 being electrically connected to the battery protection module 109 and the control board 101, and the power supply module 110 being provided with a charging interface and a discharging interface; and a soldering iron module 111, the soldering iron module 111 being electrically connected to the battery protection module 110, and the soldering iron module 111 being provided with spot welding pen interfaces 209, where the ADC detection module 102 is used for detecting the battery 106, the power supply module 110 and the soldering iron module 111 and feeding data back to the control board 101.

It should be noted that the ADC detection module 102 is used for battery voltage detection, temperature detection, output state detection and key detection; the power MOS module 107 is used for adjusting output power; and a function of the control board 101 may be implemented by using an existing technical apparatus, which is not described too much herein. The ADC detection module 102 is an existing common technical circuit and component, and the ADC detection module 102 detects output states (temperature, voltage and power) of spot welding pens connected. As shown in FIG. 2, the charging interface and the discharging interface of the power supply module 110 are generally a universal serial bus (USB) interface 210 and a Type-c interface 211. Two spot welding pen interfaces 209 are generally provided, and may be of the same type or may be of different types. Generally, temperature feedback is controlled in a mode of arranging an operational amplifier and a comparator, and a welding temperature is further automatically adjusted in cooperation with the control board 101. A circuit in the battery protection module 109 is generally a commonly used protection circuit for preventing overcharge, overdischarge, overcurrent and short circuit, which is not described too much herein.

Specifically, as shown in FIG. 1, the portable spot welder includes a buzzer module 105, where the buzzer module 105 is electrically connected to the control board 101 to facilitate the portable spot welder to remind a user; and the buzzer module 105 further matches with the LED module 104 to achieve light and sound alarm prompt, etc.

Specifically, as shown in FIGS. 1 and 2, the key module 103 includes: a switch key 202 and a gear switch key 203, the switch key 202 being used for startup and shutdown and mode switch, for example, the switch key 202 being longly pressed for several seconds for startup and shutdown, the switch key 202 being shortly pressed for switch between an automatic gear and a manual gear of a welding mode, and the gear switch key 203 being used for switching welding power; and further includes: a manual spot welding key 204, the function of which is to facilitate manual spot welding of a user. Generally speaking, the LED module 104 includes gear indicator lamps 203, electric quantity indicator lamps 207, and switch indicator lamps, where the three kinds of indicator lights have different colors, and the switch indicator lamps include a manual switch indicator lamp 205 and an automatic switch indicator lamp 206; and the at least two gear indicator lamps 208 and the at least two electric quantity indicator lamps 207 are arranged.

It should be noted that the present disclosure may be used for welding 18650, 26650, 32650 and 21700 cylindrical lithium batteries, nickel-hydrogen batteries, nickel-cadmium batteries, lipid batteries and other ternary lithium polymer batteries for nickel conversion, and may further be used for welding low-hardness stainless steel/iron having a thin size.

When the present disclosure is in use, the mode of short circuit detection by means of the control board 101 is as follows: output needs to be disconnected after single-time welding is successful, and otherwise output welding is forbidden if it is detected that continuous short circuits are output. Low-electric-quantity alarm prompt may further be carried out by means of an LED flashing mode; and smart dormancy standby is carried out, and the portable spot welder automatically enters a standby mode or a shutdown mode during no operation in a set time range. The portable spot welder may further be electrically connected to a 936 soldering iron handle on a market for use.

To sum up, the present disclosure electrically connects the control board 101, the battery 106, the ADC detection module 102, the power MOS module 107, the optical-coupler isolation module 108, the soldering iron module 111 and other circuits and components together by means of ingenious layout, thereby monitoring a state of the battery in real time, reducing risks of overcharge, overdischarge, overcurrent and a short circuit, and prolonging service life of the battery; isolates input and output by means of the optical-coupler isolation module, and moreover, detects whether an output end is short-circuited, so as to protect the portable spot welder and the battery; detects voltage of the circuits and temperatures of the components by means of the ADC detection module, thereby improving a safety coefficient during use; integrates functions of a power bank pipeline, thereby achieving bidirectional charge and discharge to serve as an emergency power bank; may use spot welding pens commonly used in a market by means of the spot welding pen interfaces, and adds a temperature control function to automatically adjust a temperature of a current gear, thereby achieving optimal gear welding power, and simultaneously saving electric energy; and monitors a temperature, voltage, current, etc. of the portable spot welder, gives an alarm prompt when the portable spot welder is abnormal, and moreover, has a small overall size and is convenient to carry. What is described above greatly improves practical values of the present disclosure.

The embodiments mentioned above are merely one or several implementations of the present disclosure, and are specifically described in details, but may not be interpreted as limiting the scope of the patent for the present disclosure as a result. It shall be noted that for those of ordinary skill in the art, they may also make several transformations and improvements on the premise of not deviating from the conception of the present disclosure, and these transformations and improvements shall fall within the scope of protection of the present disclosure. Hence, the scope of protection of the present disclosure shall be subject to the appended claims.

What is claimed is:

1. A portable spot welder, comprising: a control board, a logic chip being arranged on the control board;
    a battery, the battery being electrically connected to the control board;
    an analog-to-digital converter (ADC) detection module, the ADC detection module being electrically connected to the control board;
    a light emitting diode (LED) module, the LED module being electrically connected to the control board;
    a key module, the key module being electrically connected to the control board;
    a power metal oxide semiconductor (MOS) module, the power MOS module being electrically connected to the battery, and being used for adjusting output power;
    an optical-coupler isolation driving module, the optical-coupler isolation driving module being electrically connected to the power MOS module and the control board;
    a battery protection module, the battery protection module being electrically connected to the battery and the control board, and being used for performing overcharge, overdischarge, overcurrent and short-circuit protection on the battery;
    a power supply module, the power supply module being electrically connected to the battery protection module and the control board, and being provided with a charging interface and a discharging interface; and
    a soldering iron module, the soldering iron module being electrically connected to the battery protection module, and being provided with spot welding pen interfaces, wherein
    the ADC detection module is used for detecting the battery, the power supply module and the soldering iron module and feeding data back to the control board.

2. The portable spot welder according to claim 1, further comprising: a buzzer module, wherein the buzzer module is electrically connected to the control board.

3. The portable spot welder according to claim 1, wherein the key module comprises a switch key and a gear switch key.

4. The portable spot welder according to claim 3, wherein the switch key is used for startup and shutdown and mode switch.

5. The portable spot welder according to claim 1, wherein the key module further comprises: a manual spot welding key.

6. The portable spot welder according to claim 1, wherein the LED module comprises: gear indicator lamps, electric quantity indicator lamps and switch indicator lamps.

7. The portable spot welder according to claim 6, wherein the at least two gear indicator lamps and the at least two electric quantity indicator lamps are arranged.

* * * * *